(12) United States Patent
Tsai et al.

(10) Patent No.: US 12,051,338 B2
(45) Date of Patent: Jul. 30, 2024

(54) HUMAN LARYNGEAL MODEL FOR SIMULATION OF ENDOSCOPIC GUIDED INJECTION LARYNGOPLASTY SURGERY AND HUMAN HEAD AND NECK MODEL

(71) Applicants: NATIONAL CHENG KUNG UNIVERSITY, Tainan (TW); NATIONAL CHENG KUNG UNIVERSITY HOSPITAL, Tainan (TW)

(72) Inventors: Shu Wei Tsai, Tainan (TW); Chun-Wei Tang, Tainan (TW); Jenn-Ren Hsiao, Tainan (TW); Chou-Ching Lin, Tainan (TW)

(73) Assignees: NATIONAL CHENG KUNG UNIVERSITY, Tainan (TW); NATIONAL CHENG KUNG UNIVERSITY HOSPITAL, Tainan (TW)

(*) Notice: Subject to any disclaimer, the term of this patent is extended or adjusted under 35 U.S.C. 154(b) by 865 days.

(21) Appl. No.: 17/152,297

(22) Filed: Jan. 19, 2021

(65) Prior Publication Data
US 2022/0157194 A1    May 19, 2022

(30) Foreign Application Priority Data

Nov. 18, 2020  (TW) ................................ 109140251

(51) Int. Cl.
*G09B 23/28*     (2006.01)
*B33Y 80/00*    (2015.01)

(52) U.S. Cl.
CPC ............ *G09B 23/285* (2013.01); *B33Y 80/00* (2014.12)

(58) Field of Classification Search
CPC ....... G09B 23/28; G09B 23/285; G09B 23/30
See application file for complete search history.

(56) References Cited

U.S. PATENT DOCUMENTS

| | | | | |
|---|---|---|---|---|
| 3,471,944 A * | 10/1969 | Breckwoldt | ........... | G09B 23/30 40/490 |
| 5,846,087 A * | 12/1998 | Scherer | ................ | G09B 23/285 434/270 |
| 7,648,367 B1 * | 1/2010 | Makower | ............. | G09B 23/285 434/262 |
| 8,556,635 B2 * | 10/2013 | Toly | ..................... | G09B 23/285 434/262 |
| 8,764,450 B2 * | 7/2014 | Pugh | ...................... | G09B 23/30 434/270 |

(Continued)

*Primary Examiner* — Kurt Fernstrom
(74) *Attorney, Agent, or Firm* — Maschoff Brennan (57) ABSTRACT

The disclosure provides a human laryngeal model for simulation of endoscopic guided injection laryngoplasty surgery and for an insertion of a syringe containing a fluid. The human laryngeal model includes a laryngeal body, a seat body, and a vocal cord. The seat body is mounted to the laryngeal body. The seat body has an accommodation space. The vocal cord includes a plate and at least one bag body. The plate is stacked on the seat body, the bag body is fixed to the plate and located in the accommodation space of the seat body, and the bag body has a storage space. The vocal cord is configured for the insertion of the syringe to allow the syringe to inject the fluid into the storage space of the bag body. In addition, the disclosure also provides a human head and neck model including the human laryngeal model.

11 Claims, 10 Drawing Sheets

(56) References Cited

U.S. PATENT DOCUMENTS

| | | | |
|---|---|---|---|
| 10,354,559 B2* | 7/2019 | Sakezles | G09B 23/285 |
| 10,909,885 B2* | 2/2021 | Eichhorn | G09B 23/34 |
| 11,056,020 B2* | 7/2021 | Ozga | G09B 23/34 |
| 2008/0241807 A1* | 10/2008 | Johns | G09B 23/285 |
| | | | 434/267 |
| 2012/0202180 A1* | 8/2012 | Stock | G09B 23/34 |
| | | | 434/272 |
| 2016/0140879 A1* | 5/2016 | Hananel | G09B 23/30 |
| | | | 434/270 |
| 2019/0019434 A1* | 1/2019 | Hastings | G09B 23/32 |

* cited by examiner

HUMAN LARYNGEAL MODEL FOR SIMULATION OF ENDOSCOPIC GUIDED INJECTION LARYNGOPLASTY SURGERY AND HUMAN HEAD AND NECK MODEL

CROSS-REFERENCE TO RELATED APPLICATIONS

This non-provisional application claims priority under 35 U.S.C. § 119(a) on patent application No(s). 109140251 filed in Taiwan, R.O.C. on Nov. 18, 2020, the entire contents of which are hereby incorporated by reference.

TECHNICAL FIELD

The disclosure provides a human laryngeal model and a human head and neck model, more particularly to a human laryngeal model for simulation of endoscopic guided injection laryngoplasty surgery and a human head and neck model that has a vocal cord of a bag shape.

BACKGROUND

A functional endoscopic surgery carried out for human head and neck is considered an important surgery in otorhinolaryngology, oral surgery, and plastic surgery. This surgery is performed by regional anesthesia, but the surgical site has complex inner structures and is in a physiological position of high risk, thus it is known that realistic practice and pre-surgical planning are crucial to surgical success rates.

In this regard, there are some solutions provided to surgeons, such as hard plastic anatomical models, virtual reality simulators, 3D printed anatomical models, for better understand the structures of the surgical sites. However, the anatomical models are typically made for presentation and teaching thus its material is not surgery-oriented and not suitable for surgeons to actually use surgical instruments to perform surgery. The 3D models in virtual reality are unable to provide tactile feedback. The 3D printed anatomical models are mostly limited to the nasal region. Therefore, it is desired to develop an anatomical model suitable for practices of laryngeal surgery.

SUMMARY

The disclosure provides a human laryngeal model and a human head and neck model that are suitable for the surgeon to simulate endoscopic guided injection laryngoplasty surgery.

One embodiment of the disclosure provides a human laryngeal model for simulation of endoscopic guided injection laryngoplasty surgery and for an insertion of a syringe containing a fluid. The human laryngeal model includes a laryngeal body, a seat body, and a vocal cord. The seat body is mounted to the laryngeal body. The seat body has an accommodation space. The vocal cord includes a plate and at least one bag body. The plate is stacked on the seat body, the bag body is fixed to the plate and located in the accommodation space of the seat body, and the bag body has a storage space. The vocal cord is configured for the insertion of the syringe to allow the syringe to inject the fluid into the storage space of the bag body.

Another embodiment of the disclosure provides a human head and neck model configured for an insertion of a syringe containing a fluid. The human head and neck model includes a head and neck structure, a mouth and nose structure, and a human laryngeal model for simulation of endoscopic guided injection laryngoplasty surgery. The mouth and nose structure is mounted to the head and neck structure, and the mouth and nose structure has a nasal cavity and an oral cavity. The human laryngeal model includes a laryngeal body, a seat body, and a vocal cord. The laryngeal body is mounted to the mouth and nose structure. The laryngeal body has a channel and a mount recess, and the mount recess is connected to the nasal cavity and the oral cavity via the channel. The seat body is mounted in the mount recess of the laryngeal body. The seat body has an accommodation space. The vocal cord includes a plate and at least one bag body. The plate is stacked on the seat body, the bag body is fixed to the plate and located in the accommodation space of the seat body, and the bag body has a storage space. The vocal cord is configured for the insertion of the syringe to allow the syringe to inject the fluid into the storage space of the bag body.

According to the human laryngeal model and the human head and neck model discussed in the above embodiments of the disclosure, the mount recess of the laryngeal body is connected to the nasal cavity and the oral cavity of the mouth and nose structure, and the vocal cord including the bag body is fixed on the seat body located in the mount recess, such that the position of the vocal cord can be determined by the endoscope placing into the mouth and nose structure through the nasal cavity or the oral cavity, thereby facilitating the insertion of the syringe into the vocal cord for injecting the fluid into the bag body of the vocal cord. Therefore, the human head and neck model can clearly present the surgical site that the surgeons require to simulate and provide them the tactile feedback similar to that of the real surgery.

BRIEF DESCRIPTION OF THE DRAWINGS

The present disclosure will become better understood from the detailed description given herein below and the accompanying drawings which are given by way of illustration only and thus are not intending to limit the present disclosure and wherein.

DETAILED DESCRIPTION

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

In addition, the terms used in the present disclosure, such as technical and scientific terms, have its own meanings and can be comprehended by those skilled in the art, unless the terms are additionally defined in the present disclosure. That is, the terms used in the following paragraphs should be read on the meaning commonly used in the related fields and will not be overly explained, unless the terms have a specific meaning in the present disclosure.

Figure 1:
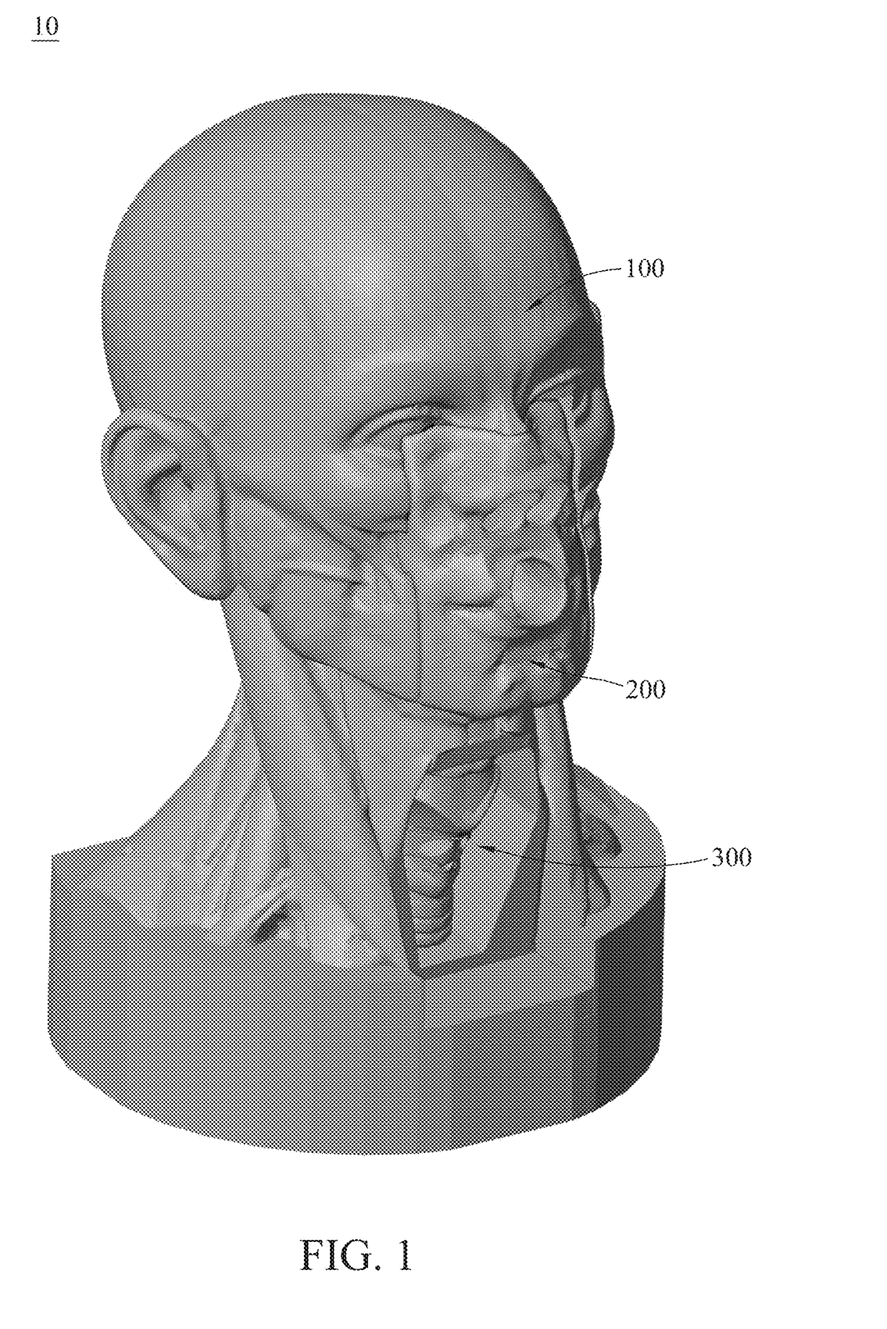
FIG. 1 is a perspective view of a human head and neck model according to one embodiment of the disclosure.
Figure 2:
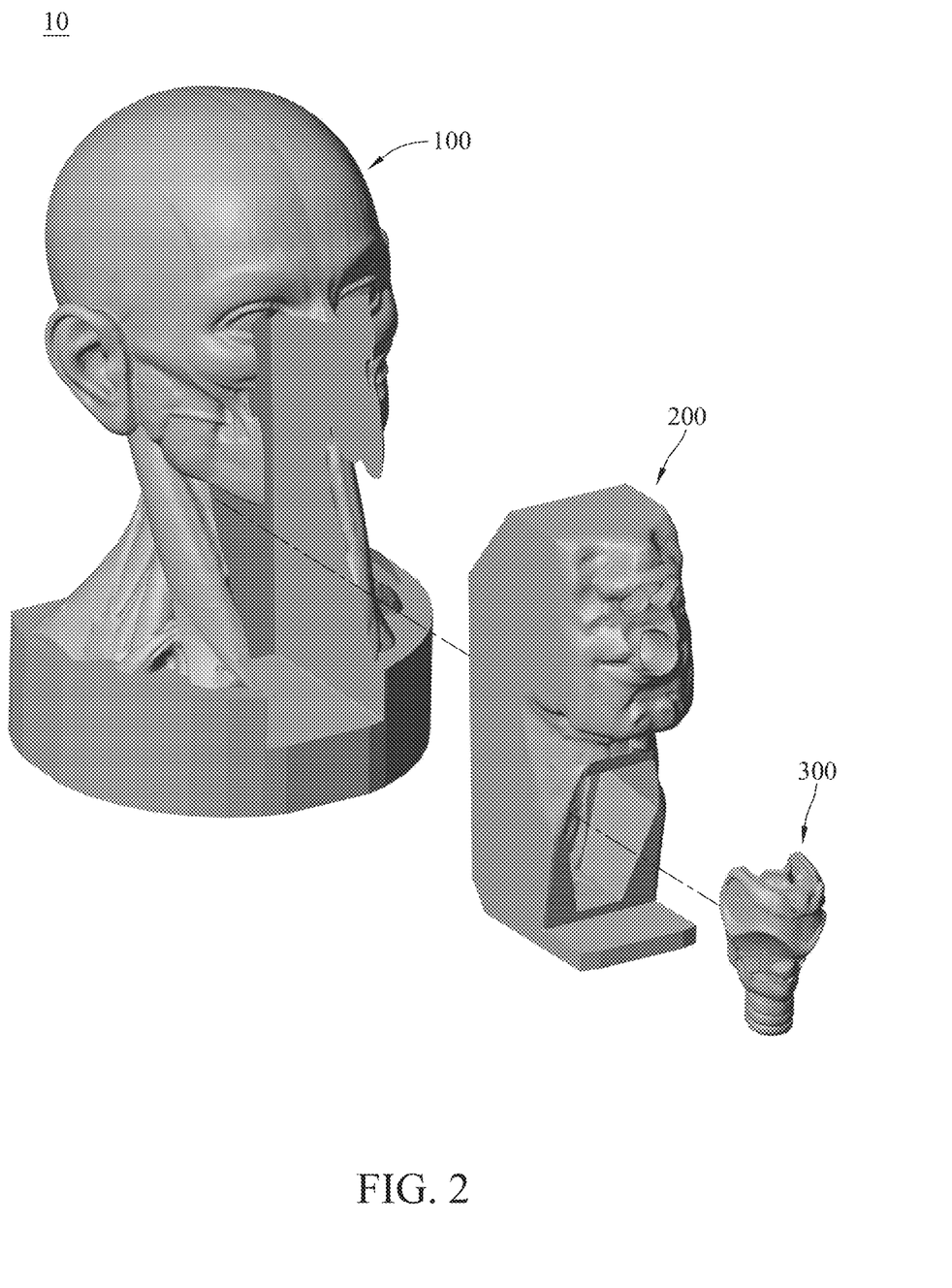
FIG. 2 is an exploded view of the human head and neck model in FIG. 1.

Referring to FIGS. 1 and 2, there are shown a perspective view of a human head and neck model 10 according to one embodiment of the disclosure and an exploded view of the human head and neck model 10 in FIG. 1.

In this embodiment, the human head and neck model 10 includes a head and neck structure 100, a mouth and nose structure 200, and a human laryngeal model 300 that is configured for simulation of endoscopic guided injection laryngoplasty surgery.

Figure 3:
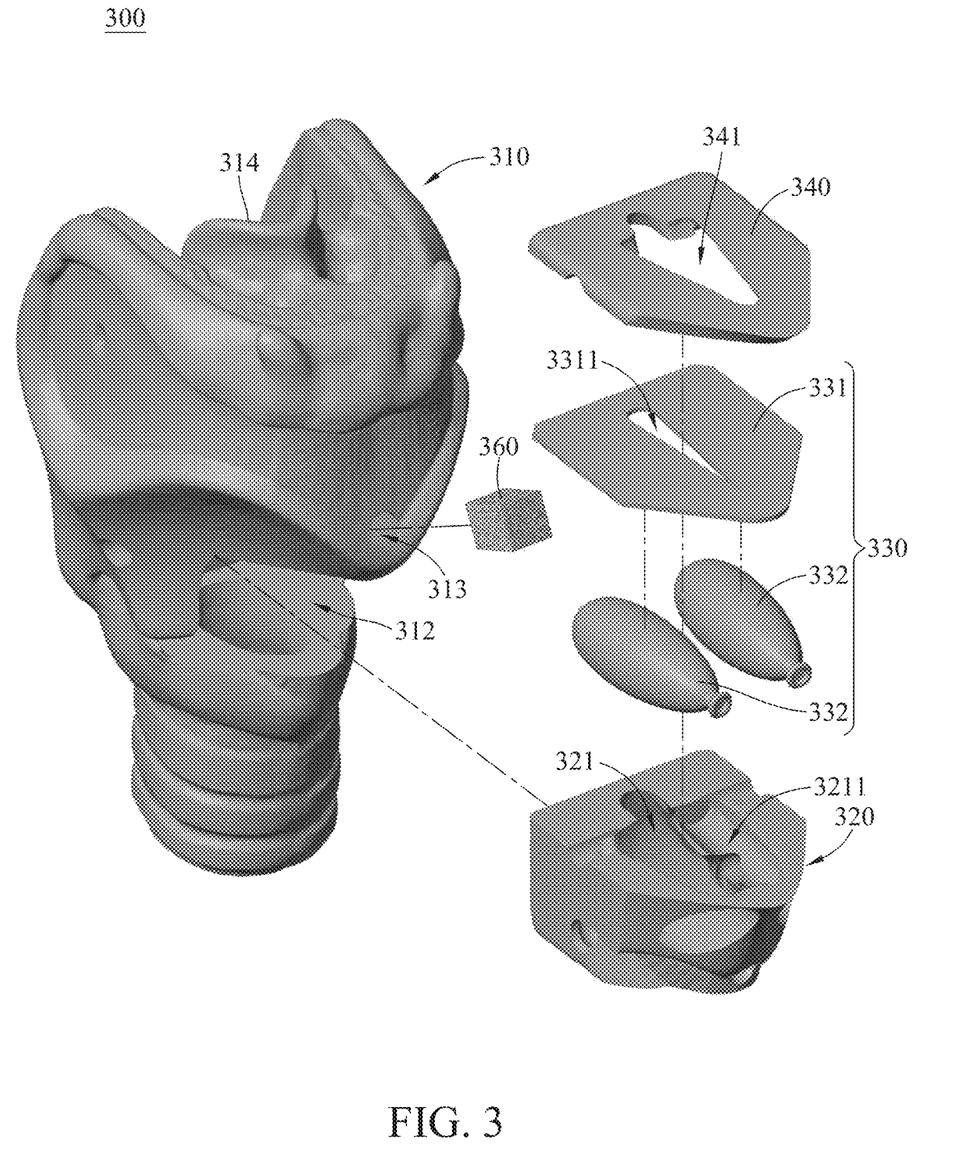
FIG. 3 is an exploded view of a human laryngeal model of the human head and neck model in FIG. 2.
Figure 4:
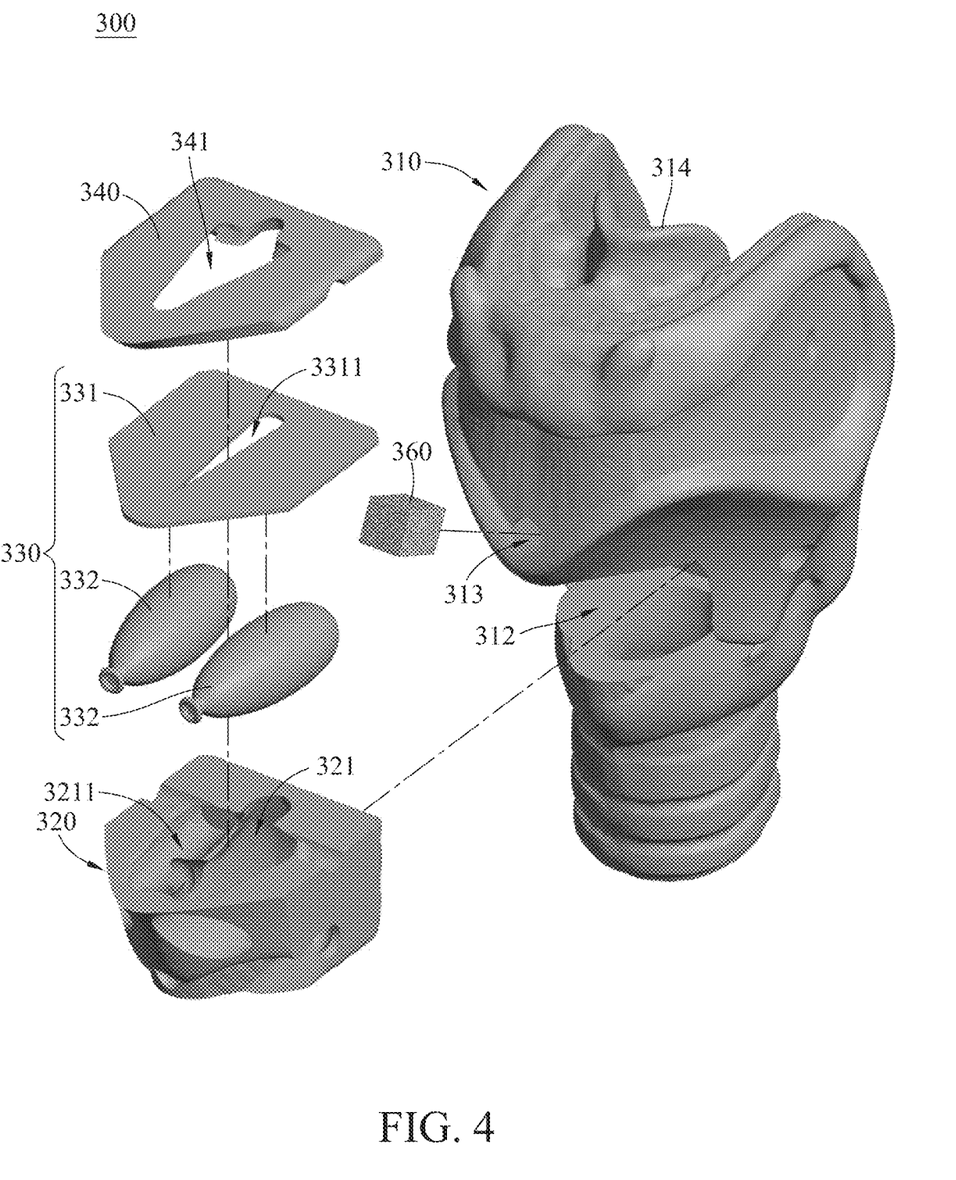
FIG. 4 is another exploded view of the human laryngeal model in FIG. 2.
Figure 5:
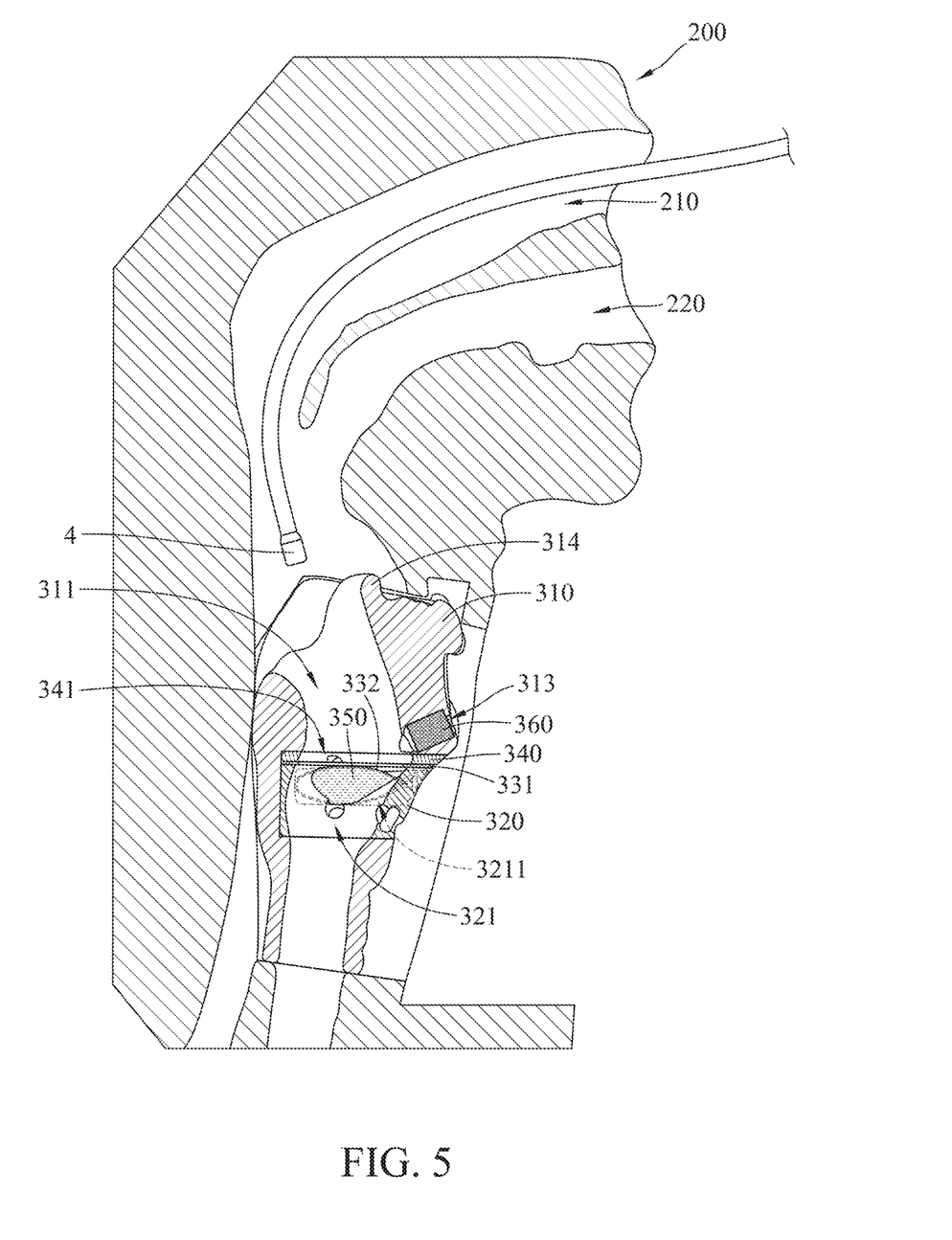
FIG. 5 is a cross-sectional view of a mouth and nose structure and the human laryngeal model of the human head and neck model in FIG. 2.
Figure 6:
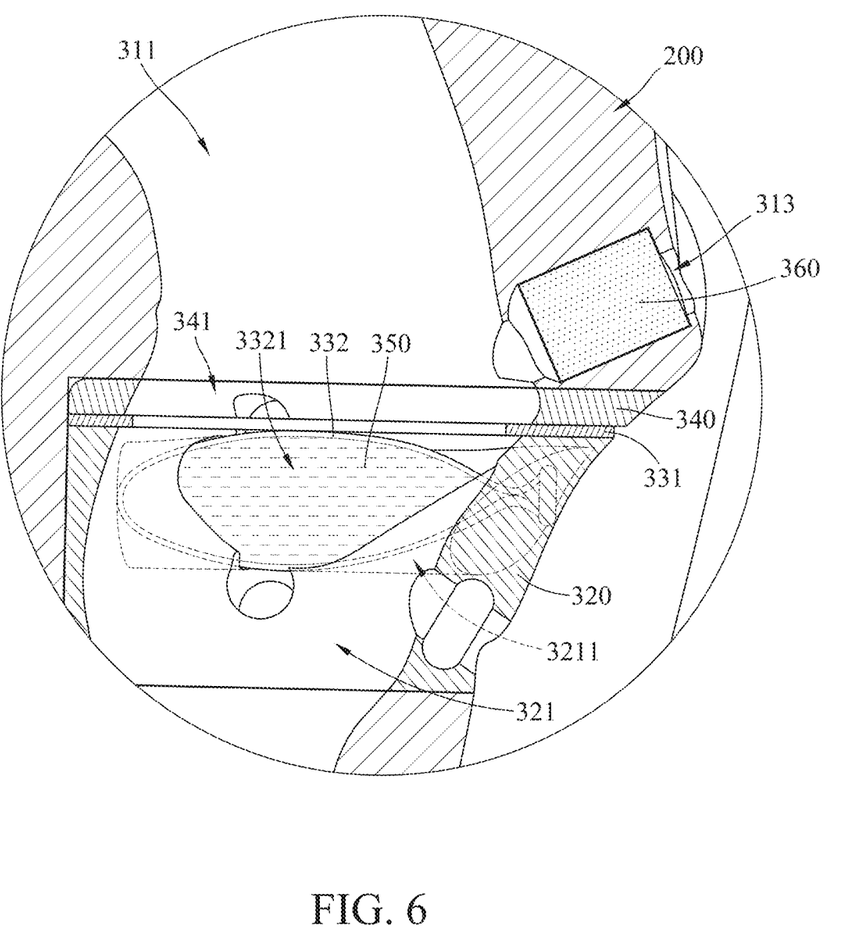
FIG. 6 is a partially enlarged view of the mouth and nose structure and the human laryngeal model in FIG. 5.

Then, further referring FIGS. 3 to 7, there are shown an exploded view of the human laryngeal model 300 in FIG. 2, another exploded view of the human laryngeal model 300 in FIG. 2, a cross-sectional view of the mouth and nose structure 200 and the human laryngeal model 300 in FIG. 2, a partially enlarged view of the mouth and nose structure 200 and the human laryngeal model 300 in FIG. 5, and a schematic view of the human laryngeal model 300 in FIG. 5 captured by an endoscope 4.

The head and neck structure 100 and the mouth and nose structure 200 are, for example, 3D printed. The head and neck structure 100 and the mouth and nose structure 200 are made of, for example, poly lactic acid or acrylonitrile butadiene styrene. The mouth and nose structure 200 is, for example, removably mounted to the head and neck structure 100. The mouth and nose structure 200 has a nasal cavity 210 and an oral cavity 220. The nasal cavity 210 and the oral cavity 220 are configured for the insertion of the endoscope 4.

The human laryngeal model 300 is configured for the insertion of a needle of a syringe 1. The syringe 1 can be used to inject a fluid 3 into where the syringe 1 is inserted. The human laryngeal model 300 includes a laryngeal body 310, a seat body 320, and a vocal cord 330. In this or another embodiment, the human laryngeal model 300 may further include a cover 340, a preserved fluid 350, and a filler 360.

The laryngeal body 310 and the seat body 320 are 3D printed and made of, for example, a flexible and thermoplastic material (e.g., thermoplastic polyurethane). The laryngeal body 310 is, for example, removably mounted to the mouth and nose structure 200. The laryngeal body 310 has a channel 311 and a mount recess 312 connected to each other. The channel 311 is shaped to be similar to human laryngeal. The mount recess 312 is connected to the nasal cavity 210 and the oral cavity 220 via the channel 311. The seat body 320 is, for example, removably mounted in the mount recess 312 of the laryngeal body 310. The seat body 320 has an accommodation space 321. The vocal cord 330 includes a plate 331 and two bag bodies 332. The plate 331 is, for example, made of silicone. The plate 331 is stacked and fixed on the seat body 320 via, for example, adhesive. The plate 331 has a through hole 3311. The through hole 3311 is shaped to be similar to the rima glottidis between the true vocal cords and the arytenoid cartilages of the larynx.

The through hole 3311 is connected to the accommodation space 321 of the seat body 320.

Figure 7:
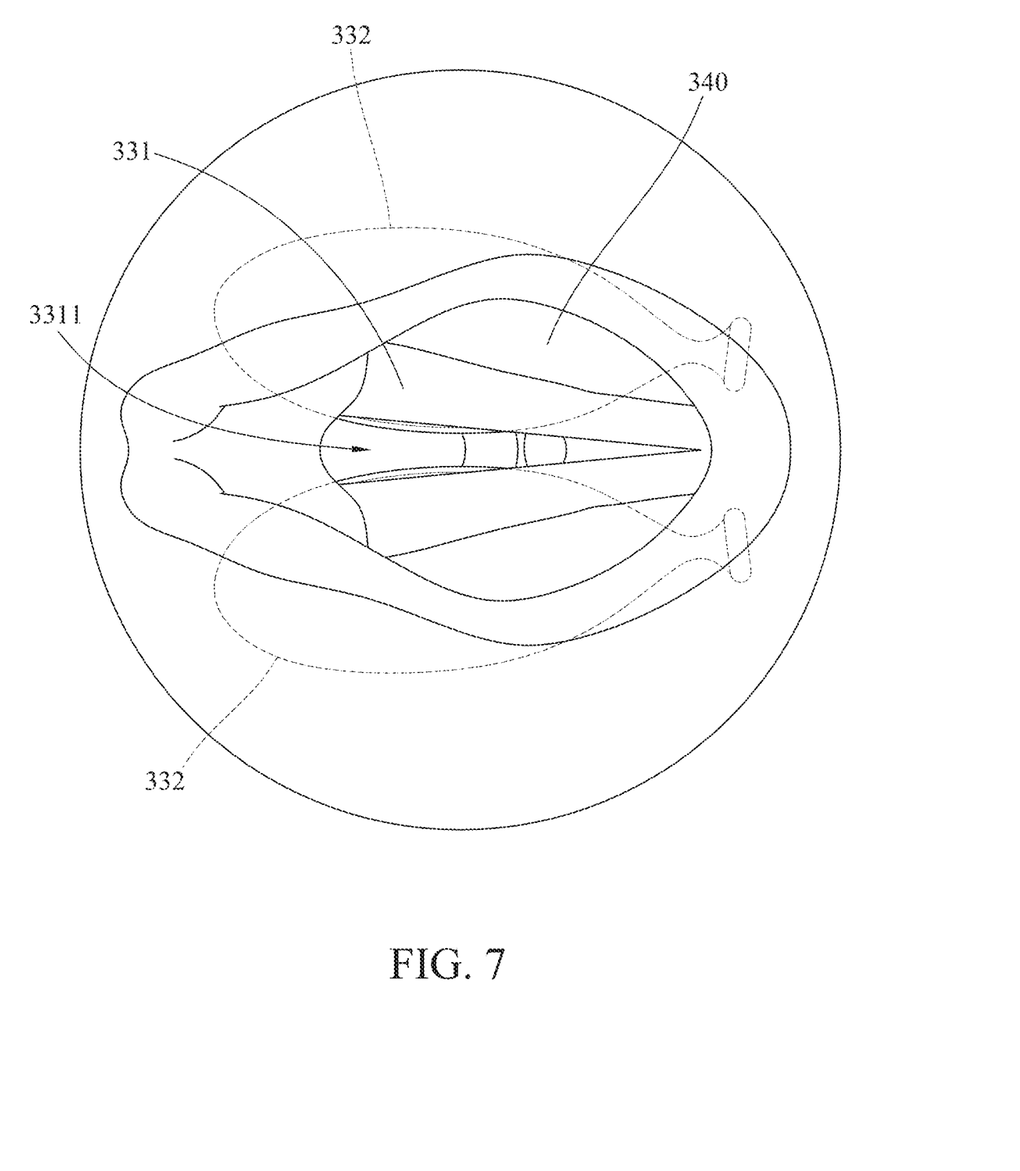
FIG. 7 is a schematic view of the human laryngeal model in FIG. 5 captured by an endoscope.

In this embodiment, the accommodation space 321 of the seat body 320 has two accommodation portions 3211 separated from and opposite to each other. The bag bodies 332 are two hollow objects (e.g., balloons) that each have a storage space 3321. The preserved fluid 350 is, for example, water or hyaluronic acid. The storage space 3321 of each bag body 332 is fully filled with the preserved fluid 350 so that the bag body 332 is kept in a specific shape by the preserved fluid 350; as shown, the bag bodies 332 are in round but not flat shape. As shown in FIG. 7, the bag bodies 332 both are fixed on the plate 331, and the bag bodies 332 are respectively located at the accommodation portions 3211 and located at two opposite sides of the through hole 3311. One side of each bag body 332 located close to the through hole 3311 of the plate 331 is not blocked by the plate 331 or the seat body 320.

In this embodiment, the bag bodies 332 are adhered to the surface of the plate 331 facing the accommodation space 321 and adhered to the inner surface of the seat body 320 that forms the accommodation portion 3211, such that the bag bodies 332 can be firmly positioned in the accommodation space 321 of the seat body 320 and prevented from moving due to impacts.

The cover 340 is 3D printed and made of a flexible and thermoplastic material (e.g., thermoplastic polyurethane). The cover 340 is stacked on a side of the plate 331 away from the seat body 320. The cover 340 has an opening 341. The through hole 3311 is located between and connected to the opening 341 and the accommodation space 321.

In this embodiment, the laryngeal body 310 further has a through hole 313 connected to the mount recess 312. The filler 360 has a structure and function similar to sponge. The filler is softer than the laryngeal body 310. The filler 360 is placed in the through hole 313 of the laryngeal body 310.

Figure 8:
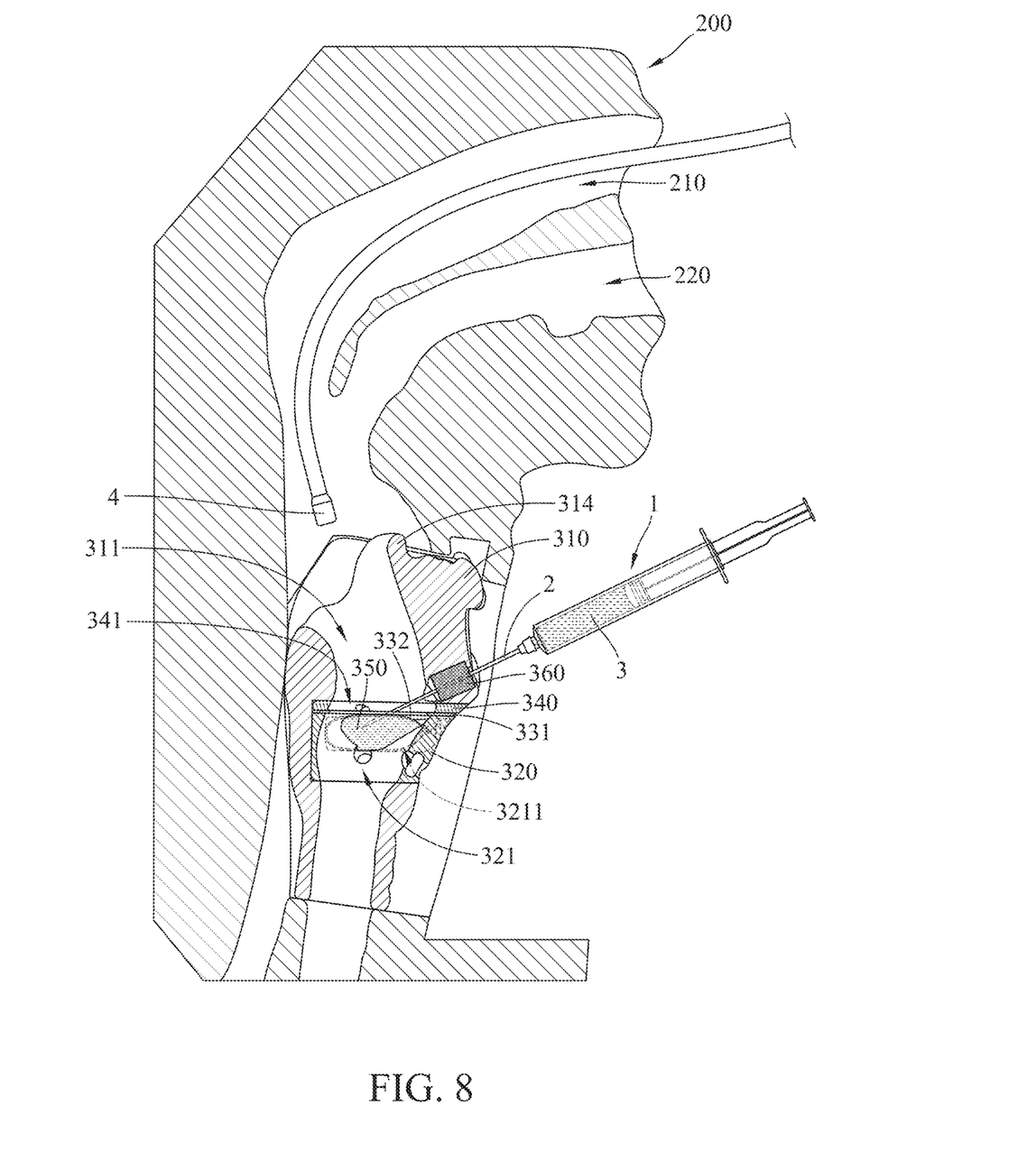
FIG. 8 is a cross-sectional view of the mouth and nose structure and the human laryngeal model in FIG. 2 when being used.
Figure 9:
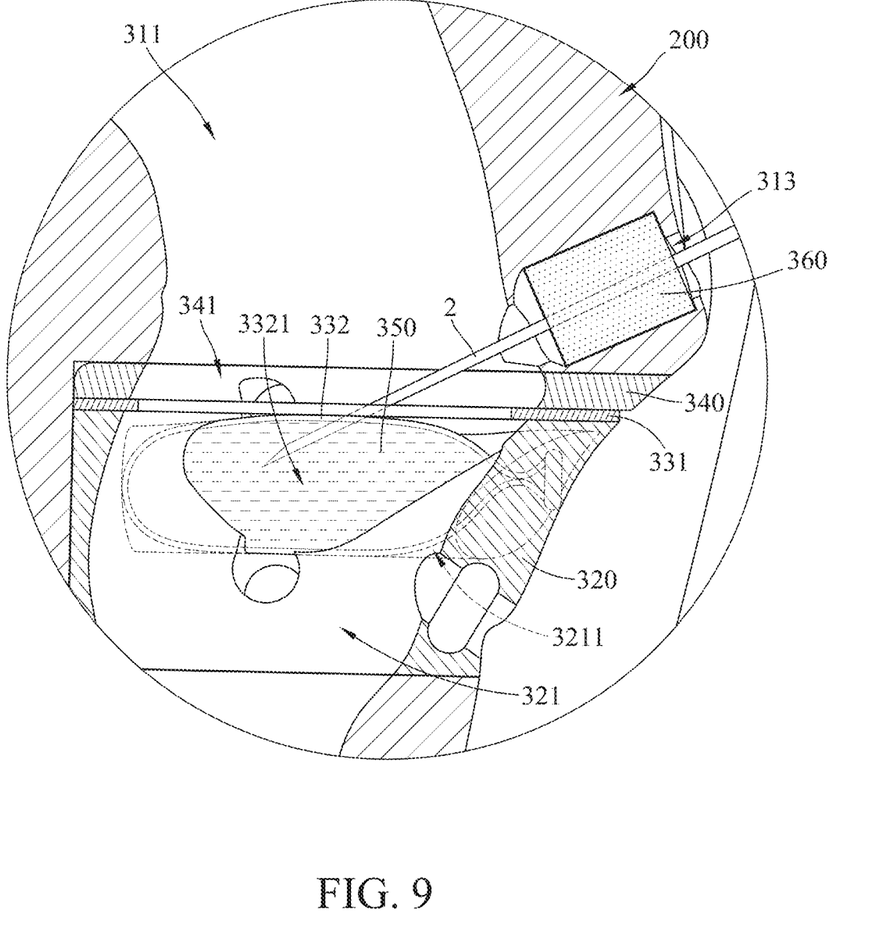
FIG. 9 is a partial enlarged view of the mouth and nose structure and the human laryngeal model in FIG. 8.
Figure 10:
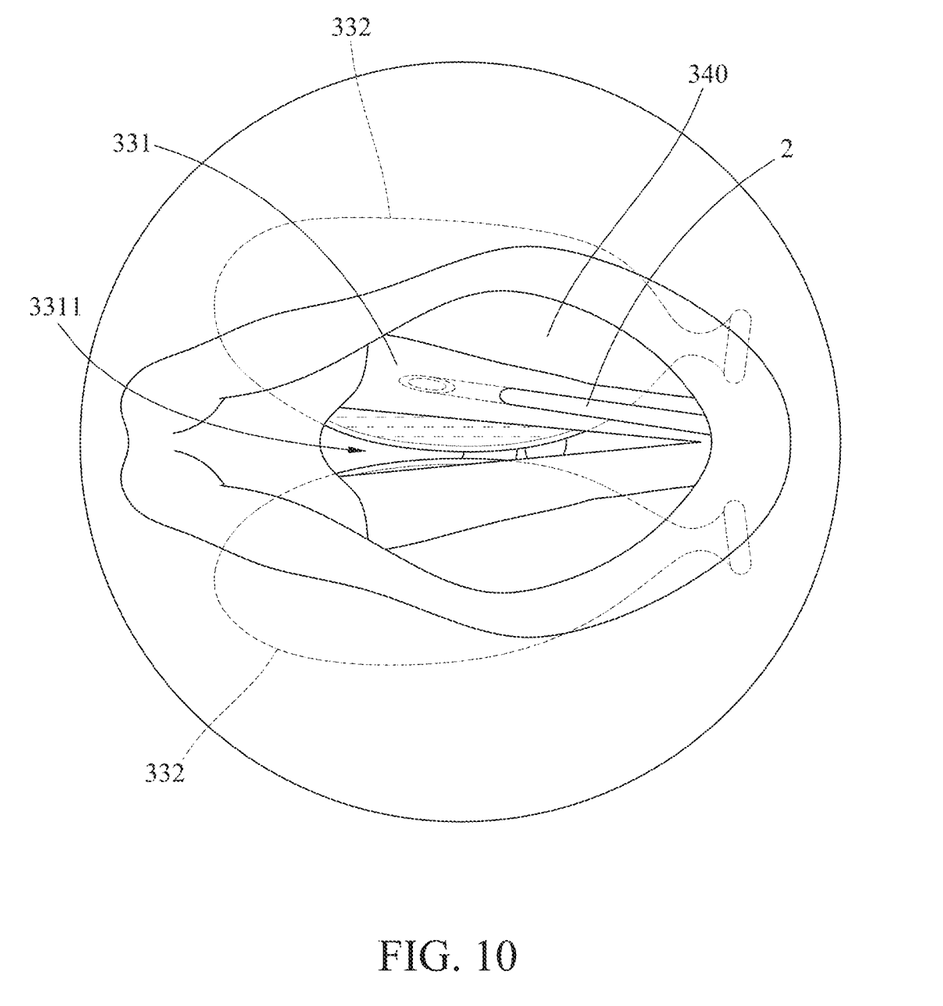
FIG. 10 is a schematic view of the human laryngeal model in FIG. 8 captured by the endoscope.

The usage of the human laryngeal model 300 will be described in the following paragraphs. Referring to FIGS. 8 to 10, there are shown a cross-sectional view of the mouth and nose structure 200 and the human laryngeal model 300 in FIG. 2 when being used, a partial enlarged view of the mouth and nose structure 200 and the human laryngeal model 300 in FIG. 8, and a schematic view of the human laryngeal model 300 in FIG. 8 captured by the endoscope 4.

To simulate an endoscopic guided injection laryngoplasty surgery, the first step is to place the endoscope 4 into the mouth and nose structure 200 through the nasal cavity 210 to observe the through hole 3311 of the plate 331 of the laryngeal body 310, which is to determine the positions of the bag bodies 332 with respect to the through hole 3311. Then, the second step is to insert the needle 2 of the syringe 1 into the filler 360, the plate 331 and all the way into one of the bag bodies 332 to inject the fluid 3 into the storage space 3321 of the bag body 332. The above steps are for the simulation of the endoscopic guided injection laryngoplasty surgery.

It is noted that, if required, the endoscope 4 may be placed into the mouth and nose structure 200 through the oral cavity 220.

In this embodiment, the mount recess 312 of the laryngeal body 310 is connected to the nasal cavity 210 and the oral cavity 220 of the mouth and nose structure 200, allowing the endoscope 4 to be placed into the mouth and nose structure 200 through either the nasal cavity 210 or the oral cavity 220 to determine the position of the vocal cord 330 in the laryngeal body 310, thereby clearly presenting a realistic surgical site for surgical simulation.

In addition, the penetration of the needle 2 through the plate 331 and the bag body 332 can provide a realistic tactile feedback similar to that of inserting a needle into the true vocal cord.

In this embodiment, the plate 331 may have a thickness of approximately 0.5 mm and a Shore hardness of approximately 50 A, but the present disclosure is not limited thereto. Note that the thickness, hardness, and material of the plate 331 can be modified as required. For example, in some embodiments, the plate may have a Shore hardness of 70 A. In another embodiment, the plate may be made of synthetic rubber and have a thickness of 1 mm and a Shore hardness of A50, A65, or A70. In still another embodiment, the plate may be made of amber-colored rubber and have a thickness of 1 mm and a Shore hardness of 45 A. In still yet another embodiment, the plate may be made of polyester urethane and have a thickness of 1 mm and a Shore hardness of 50 A or 70 A.

In this embodiment, the injection of the fluid 3 into the bag body 332 by the syringe 1 can provide a realistic feedback similar to that of injecting fluid into a true vocal cord.

In addition, since one side of the bag body 332 that is located close to the through hole 3311 of the plate 331 is not blocked by the plate 331 or the seat body 320, the bag body 332 will expand or deform towards a specific direction during the injection of the fluid 3, which making the change of the expansion of the bag body 332 become more obvious to observe from the through hole 3311.

It is noted that the amount of the preserved fluid 350 pre-stored in the bag body 332 before the injection of the fluid 3 can be modified according to actual requirements (e.g., the injection feedback).

In this embodiment, the fluid 3 may be the same as the preserved fluid 350. In specific, both the fluid 3 and the preserved fluid 350 may be water or hyaluronic acid, but the disclosure is not limited thereto. In some other embodiments, one of the fluid 3 and the preserved fluid 350 is water while the other is hyaluronic acid. In another embodiment, one of the fluid 3 and the preserved fluid 350 is in liquid state (e.g., water or hyaluronic acid) while the other is in gas state (e.g., air).

In this embodiment, the filler 360 is soft and disposed in the through hole 313 of the laryngeal body 310, thus the laryngeal body 310 can provide a sufficient structure strength while the filler 360 can provide an area for the penetration of the needle 2 into the mount recess 312 of the laryngeal body 310. And the penetration of the needle 2 through the filler 360 can provide a realistic feedback similar to that of inserting a needle into a true real laryngeal. It is noted that the filler 360 is optional; in some other embodiments, the human laryngeal model may omit the filler 360, and the penetration feedback may be directly provided by the laryngeal body.

In addition, the quantity of the bag bodies 332 as shown in the drawings is exemplary and not intended to limit the disclosure; in some other embodiment, the human laryngeal model may have only one bag body.

Further, in this embodiment, the laryngeal body 310 is flexible and soft, such that the simulation of cutting the epiglottis 314 of the laryngeal body 310 can be performed by a surgical instrument entering into the mouth and nose structure 200 through the oral cavity 220, and this simulation can operate with the endoscope 4 entering into the mouth and nose structure 200 through the nasal cavity 210.

According to the human laryngeal model and the human head and neck model discussed in the above embodiments of the disclosure, the mount recess of the laryngeal body is connected to the nasal cavity and the oral cavity of the mouth and nose structure, and the vocal cord including the bag body is fixed on the seat body located in the mount recess, such that the position of the vocal cord can be determined by the endoscope placing into the mouth and nose structure through the nasal cavity or the oral cavity, thereby facilitating the insertion of the syringe into the vocal cord for injecting the fluid into the bag body of the vocal cord. Therefore, the human head and neck model can clearly present the surgical site that the surgeons require to simulate and provide them the tactile feedback similar to that of the real surgery.

It will be apparent to those skilled in the art that various modifications and variations can be made to the present disclosure. It is intended that the specification and examples be considered as exemplary embodiments only, with a scope of the disclosure being indicated by the following claims and their equivalents.

What is claimed is:

1. A human laryngeal model for simulation of endoscopic guided injection laryngoplasty surgery, configured for an insertion of a needle of a syringe containing a fluid, comprising:
   a laryngeal body;
   a seat body, mounted to the laryngeal body, wherein the seat body has an accommodation space; and
   a vocal cord, comprising a plate and at least one bag body, wherein the plate is stacked on the seat body, the at least one bag body is fixed to the plate and located in the accommodation space of the seat body, and the at least one bag body has a storage space;
   wherein the vocal cord is configured for the insertion of the needle of the syringe to allow the syringe to inject the fluid into the storage space of the at least one bag body.

2. The human laryngeal model according to claim 1, further comprising a preserved fluid, wherein the storage space of the at least one bag body is filled with the preserved fluid.

3. The human laryngeal model according to claim 2, wherein the storage space of the at least one bag body is fully filled with the preserved fluid.

4. The human laryngeal model according to claim 2, wherein the preserved fluid is in a liquid state.

5. The human laryngeal model according to claim 1, wherein the plate has a through hole, the through hole is connected to the accommodation space, the at least one bag body comprises two bag bodies, and the two bag bodies are respectively located at two opposite sides of the through hole.

6. The human laryngeal model according to claim 1, wherein the plate is made of silicone.

7. The human laryngeal model according to claim 1, wherein the laryngeal body has a mount recess, and the seat body is removably mounted in the mount recess.

8. The human laryngeal model according to claim 7, further comprising a filler, wherein the laryngeal body has a through hole, the through hole of the laryngeal body is connected to the mount recess, the filler is placed in the through hole, the filler is softer than the laryngeal body, and the filler is configured for an insertion of the needle of the syringe.

9. The human laryngeal model according to claim 1, wherein the laryngeal body and the seat body are 3D printed and made of a flexible and thermoplastic material.

10. The human laryngeal model according to claim 1, further comprising a cover, wherein the cover is stacked on the plate and located at a side of the plate away from the seat body.

11. A human head and neck model, configured for an insertion of a needle of a syringe containing a fluid, comprising:
- a head and neck structure;
- a mouth and nose structure, mounted to the head and neck structure, wherein the mouth and nose structure has a nasal cavity and an oral cavity; and
- a human laryngeal model for simulation of endoscopic guided injection laryngoplasty surgery, comprising:
  - a laryngeal body, mounted to the mouth and nose structure, wherein the laryngeal body has a channel and a mount recess, and the mount recess is connected to the nasal cavity and the oral cavity via the channel;
  - a seat body, mounted in the mount recess of the laryngeal body, wherein the seat body has an accommodation space; and
  - a vocal cord, comprising a plate and at least one bag body, wherein the plate is stacked on the seat body, the at least one bag body is fixed to the plate and located in the accommodation space of the seat body, and the at least one bag body has a storage space;
- wherein the vocal cord is configured for the insertion of the needle of the syringe to allow the syringe to inject the fluid into the storage space of the at least one bag body.

* * * * *